United States Patent

[11] 3,608,005

| [72] | Inventor | Cecil P. Fortner<br>Bloomfield, Conn. |
|---|---|---|
| [21] | Appl. No. | 782,535 |
| [22] | Filed | Dec. 10, 1968 |
| [45] | Patented | Sept. 21, 1971 |
| [73] | Assignee | Monsanto Company<br>St. Louis, Mo. |

[54] METHOD FOR TREATING THE FLANGES OF CONTAINERS (C)
9 Claims, 9 Drawing Figs.

[52] U.S. Cl. ................................................ 264/45,
264/53, 264/138, 264/341, 264/343
[51] Int. Cl. ....................................................... B29c 25/00,
B44d 5/00
[50] Field of Search ............................................ 264/161,
341, 343, 45

[56] References Cited
UNITED STATES PATENTS

| 2,651,811 | 9/1953 | Coney ......................... | 264/341 |
| 3,020,661 | 2/1962 | Miller et al. ................. | 264/341 |
| 3,381,076 | 4/1968 | Govatsos ...................... | 264/321 |
| 3,443,008 | 5/1969 | Boyhan ........................ | 264/341 |
| 3,446,890 | 5/1969 | Emery et al ................... | 264/341 |

*Primary Examiner*—Robert F. White
*Assistant Examiner*—Gene Auville
*Attorneys*—H. B. Roberts, James C. Logomasini, Michael J. Murphy and Peter L. Costas

ABSTRACT: Containers of synthetic plastic material having an outwardly extending flange about at least a portion of their periphery have applied to the outer edge of the flange an organic compound which penetrates into the synthetic plastic material and which is caused to effect the synthetic plastic material so as to eliminate projecting portions for a smooth edge surface. Solvents and foaming agents may be used.

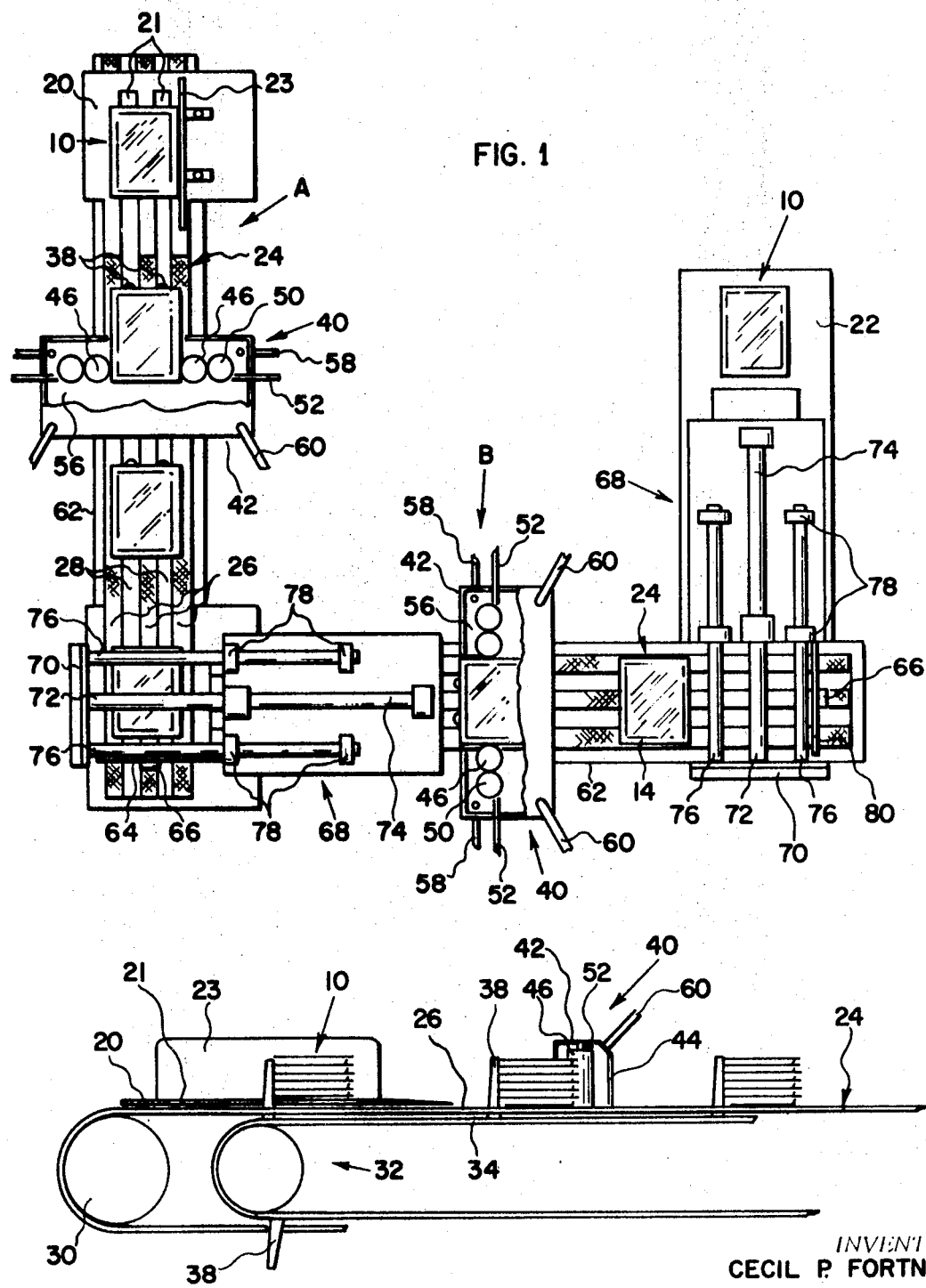

INVENTOR.
CECIL P. FORTNER

BY
Attorney

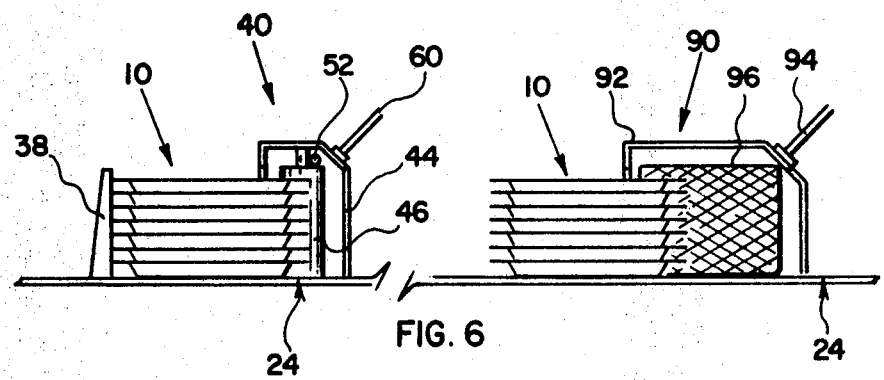
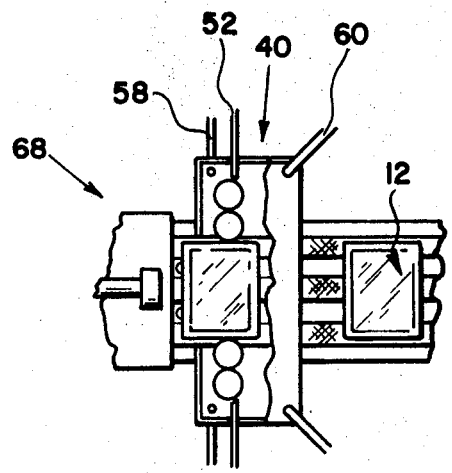
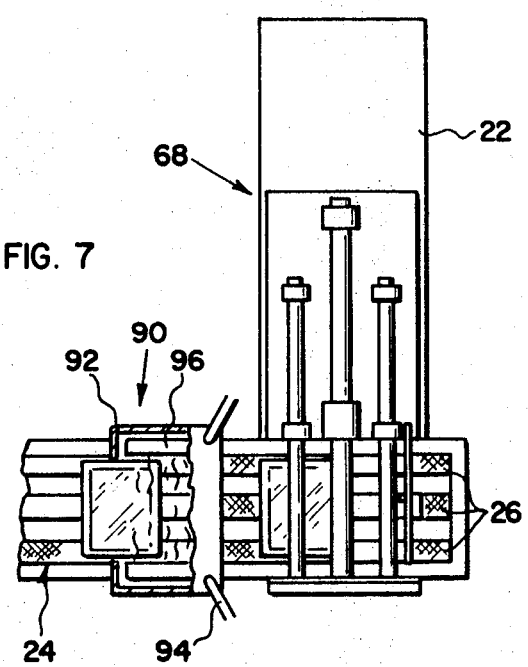
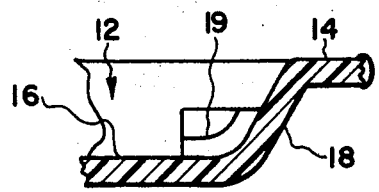
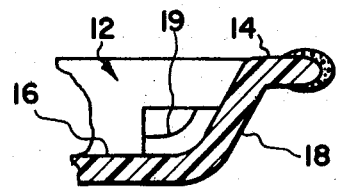

3,608,005

METHOD FOR TREATING THE FLANGES OF CONTAINERS (C)

BACKGROUND OF THE INVENTION

In recent years there has been ever increasing utilization of thermoformed containers of synthetic plastic material for various packaging applications. Amoung the most widely utilized container forms are trays which may be overwrapped with a film of synthetic plastic material to provide an attractive and hygienic container affording the opportunity to display the goods either partially or in their entirety if the tray is formed of a transparent material.

As is well known, various techniques are employed for the thermoforming and finishing of the containers from the basic sheet stock. From the standpoint of speed and economy of operation, the thermoforming technique which has achieved very widespread application involves the forming of the container depressions in a long length of the sheet material at one stage, usually several across the width of the sheet material, by means of multicavity dies, and the use of the web between the container cavities to carry the partially formed containers to a subsequent stage where the sheet material is treated to separate the container from the web of material about them. Generally, the forming dies also include cooperating surfaces providing a cutting knife edge and bed to cut substantially through the thickness of the synthetic plastic material so that the tray forms may be separated from the web at a subsequent stage simply by flexing the sheet material or otherwise applying a separating pressure.

Since the cutting dies tend to wear and since the material is, in fact, not cut through cleanly at the time of separation, there is a tendency for the crushing and fracturing to produce jagged edges and whiskers or other particles of the synthetic plastic along the edge or flange of the container, such defects hereinafter being referred to individually and collectively as "edge defects". This tendency is particularly pronounced when the material is biaxially oriented to achieve great strength at relatively low cost per pound of material. The jagged edge of the container represents a potential problem in that it may subsequently cut through a film overwrapped about the container and it and the whiskers may be unpleasant to the touch of the customer during use. Moreover, particles of plastic adjacent the edge may contaminate the contents of the container or provide a gritty feel to the customer.

It will be appreciated that the problems of slivers or crushing may be avoided by hot die or wire cutting but such a step would involve elimination of the web as a carrier for the many container units being formed or additional equipment of substantial complexity and cost and a likelihood of an increase in overall process time. Thus, it can be seen that any additional steps to be performed on the trays are desirably performed outside that type of existing thermoforming equipment which makes use of the web of the sheet material as a carrier for the molded container and at a speed sufficient to avoid any delay in high speed or in-line thermoforming operations.

It is an object of the present invention to provide a novel method for treating the flanges of synthetic plastic containers so as to provide a substantially smooth outer edge and which method is adapted to high speed operation.

It is also an object to provide such a method which also removes any projecting whiskers of synthetic plastic formed by the separating and forming operations at the edge of the flange.

Another object is to provide such a method in which a multiplicity of containers may be so treated in nested relationship at high speed and with a relatively high degree of economy.

SUMMARY OF THE INVENTION

It has now been found that the foregoing and related objects may be readily attained by a method wherein a container having a laterally projecting flange about at least a portion of the periphery thereof is subjected to a series of steps in which a multiplicity of container forms are cut from surrounding plastic material to provide a multiplicity of containers each having a laterally projecting flange about at least a portion of the periphery thereof with the cutting producing edge defects at a portion of the flange. The multiplicity of containers are stacked in nested relationship with a spacing between their flanges. Then, there is applied to the outer edge of at least a portion of the flange an organic fluid which penetrates into the synthetic plastic material thereat. The organic fluid is caused to affect the synthetic plastic material and eliminate projecting portions thereon to provide a relatively smooth surface.

Although the organic fluid may merely serve as a solvent for the synthetic plastic material, it may also be a pneumatogen which will penetrate into the material and then expand upon heating to provide a cellular, foamlike surface portion. The technique of the present invention is most desirably adapted to the treatment of a multiplicity of trays stacked in nested relationship with sufficient spacing between their flanges to avoid capillary action upon application of the fluid. It may be effected by passing the trays vertically by the application station for the organic fluid or, most desirably, by passing them in a horizontal path thereby. The technique may include a heating step wherein the edge portion is heated to evaporate the organic fluid after it has acted upon the flange or to cause foaming when a pneumatogen is utilized.

BRIEF DESCRIPTION OF THE DRAWINGS

FIG. 1 is a plan view of apparatus embodying the present invention and showing stacks of trays at various points along the flow path through the apparatus;

FIG. 2 is a partially diagrammatical, fragmentary side elevational view of the first section of the apparatus of FIG. 1;

FIG. 6 is a partially diagrammatical, fragmentary side elevational view of an alternate embodiment of apparatus for producing a foam surface on the flange;

FIG. 7 is a fragmentary plan view of the embodiment of FIG. 6;

FIG. 8 is a fragmentary sectional view to an enlarged scale of a tray showing the flange after the application of a pneumatogen thereto; and FIG. 9 is a similar view after the flange has been heated to produce foaming of the pneumatogen.

DETAILED DESCRIPTION OF THE ILLUSTRATED EMBODIMENT

Figure 3:
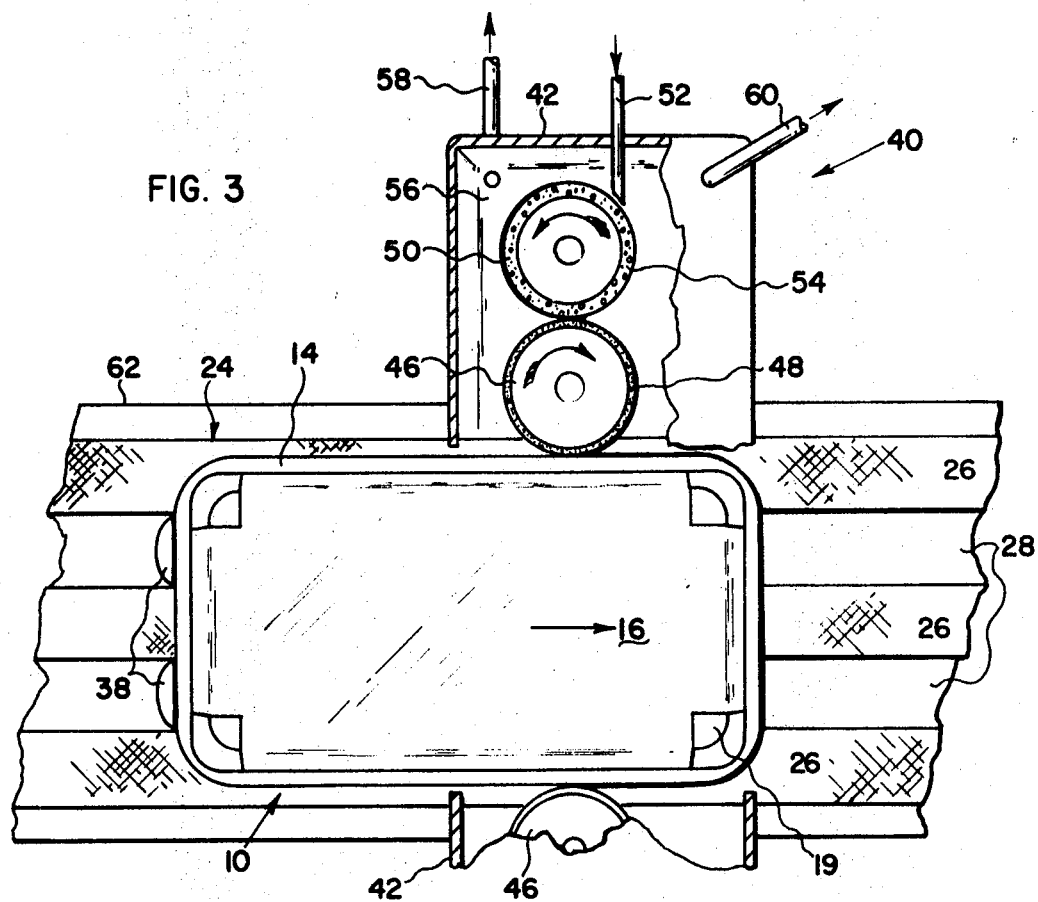
FIG. 3 is a partially diagrammatical top view to an enlarged scale of the solvent application apparatus with the housing in section and showing the applicator rolls acting upon edges of the flanges of a stack of trays.
Figure 4:
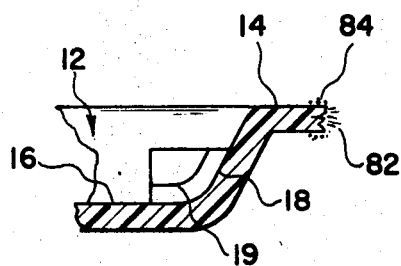
FIG. 4 is a fragmentary sectional view to an enlarged scale of a single tray showing the flange with a typical rough edge and whiskers on its surface.

Turning now in detail to the attached drawing, FIG. 1 illustrates apparatus embodying the present invention which permits treatment on all four sides of stacks of trays generally designated by the numeral 10. As best seen in FIGS. 3 and 4, the individual trays are generally designated by the numeral 12 and are of generally rectangular cross section with a flange 14 extending laterally outwardly about the periphery thereof but greatly reduced in width or eliminated entirely at the rounded corners. As seen in FIG. 4, the tray has a bottom wall 16 and a sidewall 18 extending upwardly at an angle therefrom with the laterally extending flange 14 at the upper end thereof. To provide a spacing between the flanges 14 of adjacent trays 12, the sidewall 18 is provided with stepped portions 19 adjacent the corners which provide a shelf seating the bottom of the overlying tray 12. Details of preferred tray configurations are set forth in copending United States Patent Application Serial No. 684,417, filed Nov. 20, 1967, by Donald W. Donovan, now U.S. Letters Pat. No. 3,420,431 and assigned to the same Assignee as the present invention.

The apparatus is generally comprised of two right angularly disposed conveyor sections A and B preceded by a feed table 20 and followed by a discharge table 22. Initially, a multiplicity of trays 12 is provided as a stack 10 on the feed table 20, either manually or preferably automatically, and caused to bear against the back plate 23 to effect alignment thereof. As best seen in FIG. 1, the feed table 20 provided a trifurcated bed with channels 21 therein extending parallel to the back plate 23. In this embodiment, the conveyor sections A and B each include a continuous conveyor, generally designated by the numeral 24, provided by three bands 26 spaced apart to provide channels 28 therebetween and rotating on pulley units 30 driven by suitable means (not shown).

Disposed within the conveyor belts 24 are pusher units generally designated by the numeral 32 and each comprised of a continuous belt 34 driven by pulley units 36 synchronously with the conveyor belts 24. Spaced along the length of the belts 34 and supported thereon in a position generally perpendicular thereto are pairs of rods or fingers 38 which project upwardly through the channels 28 between the bands 26 of the conveyor belts 24. As the continuous belt 34 of the pusher unit 32 of the conveyor section A rotates, its rods or fingers 38 pass through the channels 21 of the bed of the feed table 20 and engage the side of the stack 10 of trays thereon moving it from the surface of the table 20 and onto the conveyor belt 24.

As the stack 10 of trays is moved along by the conveyor belt 24 and pusher unit 32, it passes through a solvent application section generally designated by the numeral 40. The solvent application section 40 includes a housing or hood 42 extending over the conveyor section A and having openings 44 in its sides adjacent the conveyor belt 24 to permit the stacks 10 of trays 12 being conveyed by the belt to pass therethrough. At each side of the application section 40 are applicator rolls 46 which rotate about axes perpendicular to the path of movement of the conveyor 24 and which have absorbent peripheral portions 48 supplied with organic solvent by the feed rolls 50 also rotating about vertical axes. Solvent is in turn supplied to the feed rolls 50 by the supply lines 52 and, in the illustrated embodiment, drips onto the highly absorbent surface portion 54 thereof. The amount of solvent transferred to the applicator roll 46 is dependent largely upon the pressure at the nip of the two rolls, the depth of two absorbent surface portions and the amount of solvent being applied to the feed roll 50. Excess solvent falls into a drip pan 56 at the bottom of the housing 42 below the rolls 46, 50 and is recycled to the supply (not shown) through the outlet conduit 58.

To minimize contamination of the atmosphere by the organic solvent, the housing 42 is provided with exhaust conduits 60 which draw the fumes outwardly therefrom and pass them through suitable treatment apparatus (not shown). The rolls 46, 50 are adjustably mounted on the apparatus frame 62 by suitable means (not shown) so that they may be moved inwardly and outwardly relative to the conveyor 24, thus permitting the amount of contact between the absorbent peripheral portion 48 of the feed rolls 46 and the flanges 14 of the trays to be closely controlled with resultant limitation in the amount of solvent applied thereto.

In this operation, it can be seen that the fingers 38 are providing positive driving action against the trailing side of the stack 10 of trays 12, thus counteracting the pressure of the applicator rolls 46 provided by their rotation in the opposite direction and moving them forwardly in proper timed sequence and disposition. Moreover, both sides of the stack 10 are being acted upon simultaneously so that displacement transversely of the conveyor 24 is avoided. As previously indicated, it is important that the applicator rolls 46 and the stack 10 of trays be properly aligned so that only the desired amount of surface of the flanges 14 is contacted and the desired amount of solvent is transferred thereto. To the same end, the back plate 23 is desirably adjustable to provide the initial adjusted position for the stack 10 and the pair of fingers 38 maintains this position.

As the conveyor belt 24 continues to carry the stack 10 of trays, the path of movement brings the stack 10 against the stop plate 64 at the end of the conveyor section A and the stack 10 strikes the limit switch 66 thereon actuating the transfer unit generally designated by the numeral 68. In the illustrated embodiment, the transfer unit 68 is generally disposed above the conveyor belts 24 of the conveyor sections A and B and includes a vertically extending pusher plate 70 supported on the piston rod 72 which reciprocates within the piston cylinder 74 operated by air or other suitable fluid medium from a source (not shown) and controlled by the limit switch 66 to drive it to the piston retracted position and then automatically returned to the piston extended position shown in FIG. 1 of the drawings. The movement of the pusher plate 70 is stabilized by the shafts 76 which are slidably supported in the blocks 78 of the transfer unit 68. When the piston cylinder is operated by the limit switch 66, the pusher plate 70 abuts against the side of the stack 10 of trays and pushes the stack 10 from the conveyor belt 24 of the section A onto the conveyor belt 24 of the section B.

The conveyor belt 24 of the conveyor section B now begins to carry the stack 10 of trays 12 along the length thereof. The fingers 38 of the pusher units 32 move into engagement with the trailing edge of the stack 10 prior to its passage into the application section 40 so as to provide the desired positive driving pressure therebehind. In this application section 40, the previously untreated sides of the flanges 14 are exposed to solvent action. The continuing movement of the conveyor belt 24 causes the stack to abut against the stop plate 80 and strike the limit switch 66 producing actuation of the transfer unit 68 constructed and operating similarly to that previously described. This, in turn, results in movement of the stack 10 of trays 12 from the conveyor belt 24 of the section B onto the discharge table 22 from which it may be transferred either manually or automatically.

Figure 5:
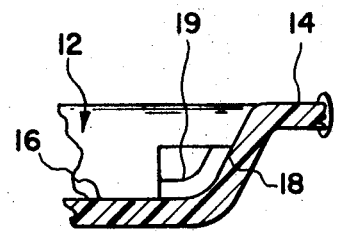
FIG. 5 is a similar view showing the flange after treatment with an organic solvent for the synthetic plastic material.

The effect of the solvent application of the present invention can best be seen in the somewhat exaggerated representations of FIGS. 4 and 5. The trays 12 to be treated are exemplified in FIG. 4 and have jagged outer edges on their flanges 14 with whiskers 82 and particles 84 thereabout. The solvent penetrates into the synthetic plastic material about the surface of the outer edge causing the material to partially dissolve and relax. As a result, the material of the whiskers 82 and particles 84 is fused into the main body of the flange 14 and the jagged edge flows into a smooth, rounded edge as illustrated in FIG. 5.

In the embodiment of the invention illustrated in FIGS. 6-9, foaming of the surface of the outer edge of the flange 14 is produced. At a point spaced along the conveyor sections A and B downstream from the application sections 40 are provided heater sections generally designated by the numeral 90 and which have a housing or hood 92 extending over the conveyors 24 and provided with exhaust conduits 94 connected to suitable fume treatment apparatus (not shown). Radiant heaters 96 or other suitable heat sources are provided at both sides of the conveyor 24 within the housing 94 so as to provide heat to the sides of the flange 14 to which a suitable organic fluid has been applied in the preceding application section 40.

In this instance, the organic fluid is not merely a solvent for the synthetic plastic but is a pneumatogen which has the ability to penetrate into the plastic material of the flange 14 and then expand upon heating to produce a foamed, cellular structure at the surface of the flange. In FIG. 8, the condition of the flange 14 of the tray 12 after application of the pneumatogen is illustrated with the whiskers 82 and particles 84 being effectively eliminated. After heating, the pneumatogen expands to produce a cellular surface portion of the type illustrated in FIG. 9.

The process and apparatus of the present invention are applicable to containers formed of various synthetic plastics and preferably thermoplastics. Exemplary materials are the polyolefins such as polyethylene, ethylene-propylene copolymers and isotactic polypropylene, polyacrylates, polymethacrylates, polycarbonates, polyvinyl chloride, polyethylene terephthalates and styrene polymers. The preferred thermoplastics are styrene polymers such as biaxially oriented polystyrene, impact polystyrene, ABS and styrene/acrylonitrile copolymers. Generally, the process is most desirably employed with biaxially oriented materials since they tend to absorb the solvent or fluid more rapidly and since an organic solvent will tend to produce relaxation or disorientation of the material to facilitate the reforming of the edge portion. Biaxially oriented polystyrene is most desirably utilized because of its excellent toughness and resilience even in thin sections and because of its relatively inert qualities with respect to foods and other materials.

Most usually, the containers will be thermoformed from synthetic plastic sheet material in order to achieve fabrication at the greatest possible rates of speed and with the greatest economy. The actual configuration of the container and of the flange is not critical since the apparatus and process may be modified to accommodate substantially any type of configuration. However, for the most facile operation, the container will normally be polygonal and preferably rectangular in cross section although it may have rounded corners as in the illustrated embodiment. The technique of the present invention is also applicable to injection molded or blow molded containers to remove flash and other projecting portions about any flange provided thereon.

In addition to the reverse roller coating apparatus of the type illustrated in the attached drawings for the application of the organic fluid, other devices may be employed for this purpose. constituted, example, the applicator roll may have a cavity therein into which the fluid is supplied and from which it passes outwardly through a porous or absorbent medium for application to the surface of the tray flange. In another type of device, the organic fluid may be applied directly to the surface of the applicator roll by spraying or dripping thereonto although this affords a lesser degree of control. In a modification of the type of device illustrated, the organic fluid may be supplied to the feed roller by spraying.

The organic fluids which are used in accordance with the present invention will vary with the nature of the plastic material being treated. When the material is biaxially oriented or highly crystalline, it is difficult to effect foaming thereof unless the synthetic plastic material also contains a nucleating agent such as the rubber reinforcement in impact modified polymers. Conversely, solvent action is far more effective with biaxially oriented polymers since the solvent action tends to produce disorientation of the material in addition to its solvent action. Various pneumatogens are known to be useful for producing surface foaming of the polymers but the preferred agent for this purpose is trichlorofluoromethane because its non-flammability and nontoxicity so as to make it useful for containers to be used for packaging applications. Among the various solvents which may be employed depending upon the particular polymer are ethylene glycol monobutyl ether, ethylene glycol monoethyl ether acetate and methyl isobutyl ketone. Methyl ethyl ketone is preferred for most applications because of its relatively high flash point, low residue and non-toxicity.

The means employed for heating to effect foaming may vary, and in fact some heating also may be included in the solvent application section to facilitate solvent action and then evaporation of the solvent when foaming is not to be effected. In place of the radiant heaters illustrated, hot air or other hot gas may be employed. Obviously, any heating elements which are employed with flammable materials should be such as to avoid the possibility of producing ignition thereof.

It will be appreciated that various types of conveyors and pusher arrangements may be employed to effect the desired movement of the trays through the solvent application stations. For example, the trays may slide on a fixed conveyor bed and be moved therealong by an overhead pusher unit or the pusher unit may have fingers projecting upwardly through the fixed slide bed. If automatic or semiautomatic operation is not required, trays may be moved manually through the solvent application station.

It can be seen that the present invention readily adapts itself to high speed operation either in conjunction with high speed thermoforming units producing containers for packaging and shipment elsewhere or in line with the actual packaging installations. The method and apparatus are relatively economical and are operable independently of the forming equipment so as to provide considerable versatility and adjustability to containers of various configurations and dimensions.

I claim:

1. In a method for treating containers of synthetic plastic material having a laterally projecting flange about at least a portion of the periphery thereof, the steps comprising: cutting a multiplicity of container forms from surrounding plastic material to provide a multiplicity of containers each having a laterally projecting flange about at least a portion of the periphery thereof, said cutting producing edge defects at a portion of said flange; stacking a multiplicity of said containers in nested relationship with spacing between their flanges; applying to the outer edge of at least a portion of said flanges of said nested stack an organic fluid which penetrates into the synthetic plastic material thereat said multiplicity of containers being stacked in nested relationship with sufficient spacing between their flanges to avoid capillary action of organic fluid therebetween; and causing said organic fluid to affect the synthetic plastic material and eliminate substantially edge defects thereon to provide a relatively smooth surface.

2. The method in accordance with Claim 1 wherein said organic fluid is a solvent for the synthetic plastic material and is caused to affect the synthetic plastic by allowing it to soften the material to eliminate substantially said edge defects and provide a relatively smooth surface.

3. The method in accordance with claim 2 wherein said synthetic plastic material is biaxially oriented and the solvent produces localized disorientation thereof.

4. The method in accordance with claim 3 wherein said synthetic plastic material is biaxially oriented polystyrene.

5. The method in accordance with claim 1 wherein the organic fluid is a pneumatogen and wherein the fluid is caused to affect the material by heating the treated flange portion after penetration of the fluid thereinto to produce foaming of at least the surface of the treated portion.

6. The method in accordance with claim 5 wherein said synthetic plastic is an impact modified biaxially oriented styrene polymer.

7. The method in accordance with claim 1 wherein said containers are of generally rectangular cross section and wherein organic fluid is applied concurrently to flanges along opposite sides thereof.

8. The method in accordance with claim 7 wherein similar steps are subsequently conducted with respect to the remaining sides of the container.

9. The method in accordance with claim 1 wherein the amount of organic fluid applied to said flanges is limited to provide contact thereof with a portion of the surface of the flanges.